May 17, 1966  W. J. DERENBECHER, JR  3,252,067
ELECTRONIC MOTOR CONTROL SERVO SYSTEM
Filed June 11, 1963
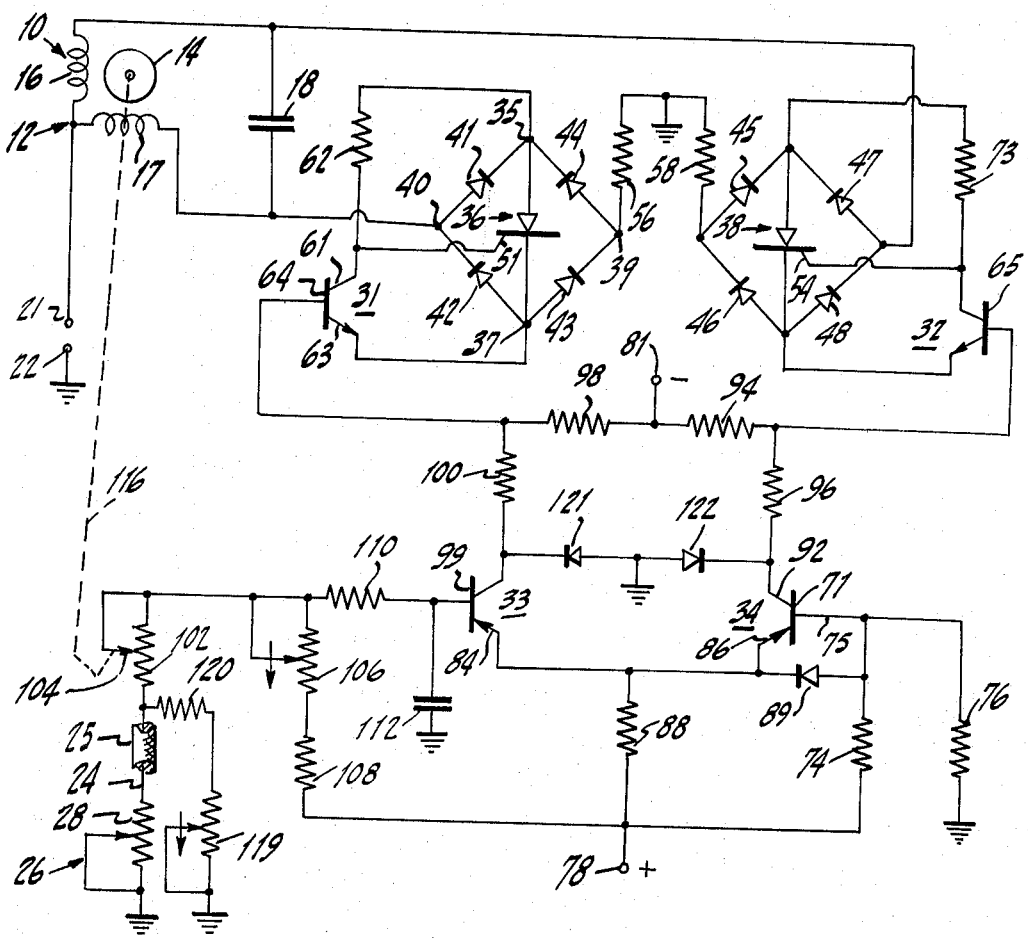
INVENTOR.
WILLIAM J. DERENBECHER, JR.
BY
George T. Craig
Attorney

United States Patent Office 3,252,067
Patented May 17, 1966

3,252,067
ELECTRONIC MOTOR CONTROL SERVO SYSTEM
William J. Derenbecher, Jr., Cherry Hill, N.J., assignor to Radio Corporation of America, a corporation of Delaware
Filed June 11, 1963, Ser. No. 287,059
3 Claims. (Cl. 318—207)

The present invention relates generally to the control of A.C. (alternating current) motors, and more particularly to a novel control system for causing the rotatable member of a motor to rotate in either direction and to stop at any desired angular position by electronic control means without need for circuit making and breaking contacts.

Many previous motor control systems for causing an electric motor to rotate and assume a desired angular position use constant application of input current to the motor with the motor at rest, thereby producing undesired heating of the motor. Also, transmission of a control or "error signal" is accomplished by transmission of an alternating or rapidly varying current so that the transmission circuit is subject to phase shift errors and crosstalk when combined with other circuits in a multi-conductor cable. The resulting phase shift in long cables may introduce loss of power and chattering of the rotor.

An object of the present invention is to provide a novel motor control system.

Another object of the present invention is to provide a novel arrangement for causing the rotor of a split phase A.C. motor to rotate to and stop at a desired angular position by transmission of a control signal.

A further object of the present invention is to provide a novel servo system for control of a split phase A.C. motor from a remote location which deenergizes the motor after movement of motor to a desired angular position.

A still further object of the present invention is to provide a novel A.C. line switching system which does not require the use of circuit making and breaking contacts.

A still further object of the present invention is to provide a servo control system for an A.C. motor which functions in response to a D.C. control signal.

Still another object of the present invention is to provide an electronic servo control system for an electric motor employing semiconductor devices throughout.

Still another object of the present invention is to provide a servo system for control of a split phase motor that requires no output or mixing transformers and still provides switching of the A.C. line to the motor with a negligible voltage drop or distortion for high efficiency and maximum torque, In accordance with the present invention an A.C. motor rotates in either direction in response to a direct current control or error signal transmitted from any more or less remote point. The polarity of the error signal with respect to the fixed reference voltage provided determines the direction of rotation of the motor and the voltage magnitude of the error determines the amount to be rotated. The error signal approaches the reference voltage as the motor rotates, nulling out when the motor completes its travel. During intervals when a control signal is not provided, the motor is at rest and either of the two phase windings is drawing current thus avoiding unnecessary heating and power loss. To accomplish motor operation in this manner, a pair of solid state rectifier bridge circuits each embodying a controlled solid state rectifier for causing selection of either one of the bridge circuits to transmit activating power to the motor causes it to operate in one direction or the other. Selection of either bridge circuit is accomplished by the polarity of the error signal. Movable means operated by the motor cancels the error signal when the motor reaches the desired angular position. Any external force on the motor that would move it from the deenergized position determined by the control potentiometer setting causes the motor to be fully energized in a direction to return the rotor to the original deenergized position.

With the control system of the present invention, a single conductor and ground connection for transmitting the error signal can be included in a multi-conductor cable, for example, a long television camera cable, without the error signal being affected by crosstalk or phase shift. The invention is especially useful in controlling a part of the optical system of a television camera, for example, the irises of the lenses from a potentiometer calibrated in iris openings at a remote point.

The invention will be described in greater detail by reference to the accompanying drawing in which:

The single figure is a schematic diagram of a servo motor control system embodying the present invention.

The motor 10 may be of usual construction and embodies a stator 12 and a rotor 14. The motor is the split-phase type having two stator windings 16 and 17. A phase shifting capacitor 18 is connected across the stator windings 16 and 17 in series. The common point between the two windings is connected to a terminal 21 and a second terminal 22 is connected to a voltage reference point in the circuit such as ground. The A.C. service input, for example 110 volts, is connected to the terminals 21 and 22.

The motor 10 may be employed to drive mechanism of any type. In the illustrative example of the drawing it will be assumed that the motor is to drive the irises for the lenses of a television camera (not shown) so that it may be controlled from a potentiometer 26 separated from the camera with the motor 10 and other circuitry mounted in or on the camera. The D.C. control signals are supplied over a conductor 24 which may be one of the conductors in a multi-conductor television camera cable 25. The control device may be a simple adjustable resistor such as a rheostat or the potentiometer 26 with its slider connected to one end of the resistor 28. The slider may be calibrated in degrees of rotation or in F/ numbers in the case of an iris control.

The direction and degree of rotation of the motor 10 is determined by a servo loop comprising a differential amplifier which includes semiconductor devices such as transistors 33 and 34, semiconductor devices such as transistors 31 and 32, the silicon controlled rectifiers 36 and 38, the rectifiers 41 to 48, and the motor 10. The rectifiers 41 to 44 are associated together in a bridge rectifier across which the controlled rectifier 36 is connected between the bridge points 35 and 37. The controlled rectifier 38 is connected in a similar manner across a second rectifier bridge which includes the rectifiers 45 to 48. The controlled rectifiers may each be, for example, a type 2N2348 silicon controlled rectifier. The controlled rectifier of this example is a PNPN semiconductor having three rectifying junctions with three terminals as shown in the drawing. The controlled rectifiers 36 and 38 have gate terminals 51 and 54, respectively.

The anode of the rectifier 44 and the cathode of the rectifier 43 are connected from bridge point 39 to ground through a resistor 56. The anode of the rectifier 41 and the cathode of the rectifier 42 are connected from bridge point 40 to one end of the stator winding 17 and the capacitor 18. When the controlled rectifier 36 fires on each half-cycle of voltage from terminal 21 the stator winding 16 will have A.C. power applied in series with the phase shifting capacitor 18 and the stator winding 17 will be fed directly thus causing the motor 10 to rotate in one direction. The rectifier bridge 45 to 48 is provided with circuit connections similar to those just explained for the bridge 41 to 44 including a resistor 58 except that A.C. power is applied to the stator winding 17 in series with the phase shifting capacitor 18 and the stator winding 16 is fed directly thus causing the motor 10 to rotate in the reverse direction when the controlled rectifier 38 fires.

The gates 51 and 54 of controlled rectifiers 36 and 38 are controlled respectively by the transistor 31 or 32. The previously mentioned bridge rectifier, composed of rectifiers 41 to 44, serves to convert A.C. applied to the bridge points 39 and 40 to rectified A.C. at points 35 and 37 such that point 35 is positive with respect to point 37. A.C. will flow through this bridge circuit and resistor 56 to energize stator winding 17 directly and stator winding 16 in series with the capacitor 18 but only when the controlled rectifier 36 is fired on each half-wave. The controlled rectifier 36 or 38 cuts off when the current through it drops to a very small value at the end of each half-cycle. The controlled rectifier 36 fires in response to cut off of the transistor 31. When this transistor 31 is in saturation firing of the controlled rectifier 36 is prevented. Transistors 31 and 32 are normally both saturated and it is possible to cut off only one at a time.

The collector 61 of the transistor 31 is connected through a resistor 62 to the positive point 35 of the rectifier bridge. The emitter 63 is returned to the negative point 37 of the rectifier bridge. In the illustrative example, the transistors 31 and 32 are the NPN junction type, therefore, when the base 64 or 65 of either is sufficiently positive the corresponding transistor 31 or 32 is in saturation. A negative voltage on the base of either transistor 31 or 32 causes the corresponding transistor to be cut off.

When the transistor 31 is cut off, a positive going A.C. signal at terminal 21 passes through the motor windings back to ground through rectifier 41, the high resistance resistor 62, the gate 51, the rectifier 43 and the resistor 56. A very small voltage across the gate is required to fire the controlled rectifier, less than 2 volts in the illustrative example, so controlled rectifier 36 fires very early in the cycle and the path of the A.C. motor current to ground after this firing is completed through the low impedance path consisting of rectifier 41, the anode to cathode of controlled rectifier 36, rectifier 43 and resistor 56. The controlled rectifier 36 fires with a gate voltage lower than the collector break-over voltage of transistor 31. After firing, the voltage between junction points 35 and 37 drops to a very low value and prevents a large voltage from being applied across transistor 31. The controlled rectifier remains fired until the current through it drops to a very low value near the end of each half-cycle. It then remains cut off until fired again. Resistors 56 and 58 are very small values useful for waveform monitoring purposes and do not drop the voltage applied from the A.C. source to the motor appreciably.

On the negative half-wave at terminal 21, the A.C. passes from ground through the resistor 56, the rectifier 44, the high resistance resistor 62, the gate 51, the rectifier 42, and the motor windings. The cut off bias applied to the base of transistor 31 with respect to ground is greater than the gate voltage required to fire the controlled rectifier 36, so the controlled rectifier 36 will fire before the emitter-base junction of transistor 31 is forward biased by the increasing negative voltage with respect to ground being applied at junction 37. The controlled rectifier 36 again fires and A.C. motor current flows from ground through the low impedance path consisting of resistor 56, the rectifier 44, the controlled rectifier 36, the rectifier 42 and the motor windings. The motor thus operates at the frequency of the A.C. service connection to the terminals 21 and 22.

When the transistor 32 is in the cut off state and transistor 31 is saturated, the motor 10 draws current through controlled rectifier 38 and operates in the reverse direction as stated above. The circuit paths for the firing voltage and motor current correspond to those described in connection with motor operation with the transistor 31 in the cut off state. Resistor 73 corresponds to the resistor 62. During the positive half-cycle at terminal 21 when transistor 31 is saturated the base current to ground is through the emitter 63, diode 43, and resistor 56. This base current is determined by the D.C. voltage source applied to the base 64. During the negative half-cycle at terminal 21 (transistor 31 still in saturation) diode 43 becomes reversed biased and the line voltage causes current to flow from ground through diode 121, through the high resistance resistor 100 and through the forward biased emitter-base junction of transistor 31 to terminal 21. Diode 121 also serves to protect transistor 33 from breakdown due to high negative voltage present in the collector circuit during the steady state interval when transistor 33 is not saturated but is conducting enough to saturate transistor 31. The diode 122 serves a similar purpose. With both transistors 31 and 32 in saturation, current to the motor windings is cut off except for a small trickle current limited by the large resistors 62, 73, 96 and 100 and there is little or no heating of the motor at standstill. Control signals at the bases of the transistors 31 and 32 accomplish motor control and reversal.

The manner in which the previously mentioned servo-loop including the transistors 33 and 34 function to control the motor 10 will now be described. The base 71 of the transistor 34 is referenced to a substantially fixed voltage which causes this transistor when conducting sufficiently to apply a positive voltage to the base 65 of the transistor 32. Transistor 32 is then saturated to prevent controlled rectifier 38 from firing and passing operating current to the motor 10. The voltage for the base 71 is taken from a connection 75 to the junction of series connected resistors 74 and 76. These resistors are connected between ground and a terminal 78. It will be understood that a connection from the positive terminal of a bias source, as indicated, is made to the terminal 78 and the negative terminal of this bias source is grounded. The negative terminal of a second bias source (not shown) is connected to the terminal 81 and the positive terminal of this second source is grounded. In the illustrative example, the terminal 78 is 45 volts positive with respect to ground and the terminal 81 is 45 volts negative with respect to ground. A wide range of power supply voltages are possible with proper selection of component values.

The emitter 84 and 86 of the transistors 33 and 34, respectively, are connected together and then to the positive terminal 78 through a resistor 88. A diode 89 is connected between the base and emitter of the transistor 34 to protect against possibility of exceeding the reverse base-to-emitter rating. The collector 92 of the transistor 34 is connected to the negative terminal 81 by way of series connected resistors 94 and 96. The junction of these resistors is connected to the base 65 of the transistor 32. Series connected resistors 98 and 100 correspond in function to the resistors 94 and 96, respectively, and are connected between negative terminal 81 and collector of transistor 33. The junction of resistors 98 and 100 is connected to the base 64 of transistor 31.

The base 99 of the transistor 33 when the system is at rest is set to a voltage value which permits transistor 34 to conduct sufficiently for a positive voltage to be applied to the base 64 of the transistor 31. The controlled rectifier 51 may thus, also, be prevented from firing. The voltage at the base 99 can be changed by manipulating the previously mentioned control device represented by the potentiometer 26. The potentiometer 26, a second adjustable resistor or potentiometer 102 (of equal value to potentiometer 26) with its slider 104 driven by the motor 10, an adjustable resistor or potentiometer 106 and a resistor 108 are connected in series between ground and the positive terminal 78. The base 99 of the transistor 33 is connected to the junction of potentiometers 102 and 106 by way of a filter resistor 110. The resistor 110 and a capacitor 112 (the capacitor connected between base 99 and ground) form a low pass filter to remove any hum or spurious signal that may be introduced in the cable 25 from affecting circuit action. The mechanical connection from the motor 10 to the potentiometer slider 104 is represented schematically by the dashed line 116. The potentiometer 106 facilitates selection of the stationary position of the motor 14 for the minimum resistance setting of the control potentiometer 26. A potentiometer 119 with limiting resistor 120 assists in selecting the stationary position of the motor 14 for the maximum resistance setting of control potentiometer 26. The potentiometers 106 and 119 may be omitted or fixed resistors may be substituted for them depending on the accuracy required and on the tolerance of the components. Values for the elements of one embodiment of the invention are given below solely by way of example.

The control potentiometer 26 may be varied to set the voltage at the base of the transistor 33 to either a more positive or more negative value than the fixed bias on the base of the transistor 34. This voltage difference is, in effect, an error signal.

For example, "positive" error signal is obtained by increasing the resistance of the potentiometer 26 from an initial position when the motor is not actuated. A positive error signal causes the transistor 33 to cut off and the transistor 34 to saturate due to the differential amplifier configuration of transistors 33 and 34. The increase in current through the transistor 34 causes the transistor 32 to go further into saturation, still preventing the controlled rectifier 38 from firing. When the transistor 33 cuts off, the base 64 of the transistor 31 goes negative which substantially cuts off this transistor. By the action described above the motor will then rotate in a direction to cause the slider 104 of potentiometer 102 to decrease resistance. A point in its movement is then reached when the positive error signal is cancelled and the motor stops, substantially where the total resistance in circuit in the branch containing potentiometers 102, 28, 120, and 119 returns to the initial value before slider of potentiometer 26 was moved.

A negative error signal reverses the action of the controlled rectifiers 36 and 38 which interchange the motor winding that is fed directly across the line and the one that is fed through the phase shift capacitor 18.

The controlled rectifiers 36 and 38 are type 2N2348.
The rectifiers 41 to 48 are type 1N538.
The diodes 121, 122, 89 are type 1N459.
The transistors 31 and 32 are type 2N2219 and the transistors 33 and 34 are type 2N329A.

These type designations for the rectifiers and transistors are given solely by way of example for one embodiment of the present invention.

By way of example, the capacitors in the single figure of the drawing may have the following values when component parts of the type just mentioned are used:

| | |
|---|---|
| Capacitor 18 | mfd 2.0 |
| Capacitor 112 | mfd .47 |

By way of example, the resistors may have the following values for the named component parts:

| | |
|---|---|
| Potentiometer 26 | ohms 15K |
| Resistor 56 | ohms 10 |
| Resistor 58 | ohms 10 |
| Resistor 73 | ohms 33K |
| Resistor 62 | ohms 33K |
| Resistor 74 | ohms 84.5K |
| Resistor 76 | ohms 84.5K |
| Resistor 88 | ohms 91K |
| Resistor 94 | ohms 820K |
| Resistor 96 | ohms 82K |
| Resistor 98 | ohms 820K |
| Resistor 100 | ohms 82K |
| Resistor 120 | ohms 150K |
| Potentiometer 102 | ohms 15K |
| Potentiometer 106 | ohms 5K |
| Resistor 108 | ohms 13K |
| Resistor 110 | ohms 27K |
| Potentiometer 119 | megohm 1 |

What is claimed is:

1. Control apparatus comprising a motor, full-wave rectifier bridge means having a pair of alternating and a pair of direct current connections, controlled rectifier means connected across the direct current connections of said rectifier bridge means, said controlled rectifier means having a gate electrode to control operation thereof, a resistor connected between one of said direct current connections of said rectifier bridge means and said gate electrode, a transistor having a base, emitter and collector electrodes, the collector electrode connected to the gate electrode of said controlled rectifier device, the emitter electrode connected to the other of said direct current connections of said rectifier bridge means, connection means including a direct current path through said resistor and said rectifier bridge means for applying direct current biasing potentials to said transistor electrodes, and means for varying the biasing potential applied to said base electrode whereby to cut off said transistor to render said gate electrode of said controlled rectifier to fire periodically to cause said motor to operate.

2. Control apparatus comprising a motor, full-wave rectifier bridge means having a pair of alternating and a pair of direct current connections, controlled rectifier means connected across the direct current connections of said rectifier bridge means, said controlled rectifier means having a gate electrode to control operation thereof, a resistor connected between one of said direct current connections of said rectifier bridge means and said gate electrode, a transistor having a base, emitter and collector electrodes, the collector electrode connected to the gate electrode of said controlled rectifier device, the emitter electrode connected to the other of said direct current connections of said rectifier bridge means, connection means including a direct current path through said resistor and said rectifier bridge means for applying direct current biasing potentials to said transistor electrodes, means for varying the biasing potential applied to said base electrode whereby to cut off said transistor to render said gate electrode of said controlled rectifier to fire periodically to cause said motor to operate, and a resistor and diode connected in series between said transistor base and ground to provide a direct current path for the base current during the negative half-cyle when said transistor is saturated to prevent the controlled rectifier from fiiring.

3. Control apparatus comprising a motor having two windings, connection means for connection to a source of alternating current, reactive means coupling an end of each of said windings, the remaining ends of said windings being connected together, a pair of full-wave rectifier bridge means each having a pair of alternating and a pair of direct current connections, a controlled rectifier means connected across the direct current connections of each of said rectifier bridge means, each controlled rectifier means having a gate electrode to control operation thereof, a resistor connected between one of said direct current connections of each of said rectifier bridge means and said gate electrode of said respective controlled rectifier means, a pair of transistors each having a base, emitter and collector electrodes, the collector electrodes of each of said transistors connected to the gate electrode of each of said controlled rectifier devices, the emitter electrodes connected to the other of said direct current connections of each of said rectifier bridge means, connection means including a direct current path through each of said respective resistors and said rectifier bridge means for applying direct current biasing potentials to said transistor electrodes, and means for selectively and oppositely varying the biasing potential applied to said base electrodes whereby to cut off either of said transistors to render said gate electrode of said controlled rectifier connected to the transistor in the cut off state effective to cause said last named controlled rectifier to fire every half-cycle to cause said motor to operate.

References Cited by the Examiner

UNITED STATES PATENTS

| | | | |
|---|---|---|---|
| 2,832,924 | 4/1958 | Cilyo | 318—28 |
| 2,846,630 | 8/1958 | Boyle et al. | 318—28 |
| 2,956,222 | 10/1960 | Hill et al. | 318—207 |
| 3,064,174 | 11/1962 | Dinger | 318—207 |
| 3,075,136 | 1/1963 | Jones | 307—88.5 |
| 3,109,971 | 11/1963 | Welch et al. | 318—30 |
| 3,155,892 | 11/1964 | Karlson | 318—207 |
| 3,168,691 | 2/1965 | Olofsson et al. | 318—207 |
| 3,183,425 | 5/1965 | Slawson | 318—227 |

JOHN F. COUCH, *Primary Examiner.*